Sept. 8, 1964

P. E. MERCIER 3,147,965

VEHICLE SUSPENSION

Filed Oct. 21, 1960

Pierre E. Mercier

INVENTOR

BY Kenderoth, Lind & Ponack

ATTORNEYS

Pierre E. Mercier
INVENTOR

Sept. 8, 1964 P. E. MERCIER 3,147,965
VEHICLE SUSPENSION
Filed Oct. 21, 1960 7 Sheets-Sheet 7

Pierre E. Mercier
INVENTOR

BY Wenderoth, Lind & Ponack
ATTORNEYS

United States Patent Office 3,147,965
Patented Sept. 8, 1964

3,147,965
VEHICLE SUSPENSION
Pierre Ernest Mercier, Piscop by Saint Brice, France, assignor to Societe Anonyme, Andre Citroen, Paris, France
Filed Oct. 21, 1960, Ser. No. 64,062
Claims priority, application France, May 12, 1954, 668,922, Patent 1,100,585
2 Claims. (Cl. 267—64)

This application is a continuation in part of application Serial No. 507,704 filed May 11, 1955, now abandoned.

The suspension devices generally comprise a mechanically deformable space formed, for instance, of a cylinder filled with liquid in which a piston slides.

One of its members is connected to the suspended mass, whereas the other is integral, for example, with the wheel carrying elements of a vehicle, so that under the influence of an impact, the piston slides in the cylinder and causes the liquid contained in the mechanically deformable space to pass through throttling nozzles damping the impact.

Suspension devices of the above-mentioned type are known in which elastic masses have been added to them.

Thus, it is known to arrange two distinct elastic masses, each formed in a chamber in which, in a deformable covering, there is a gaseous mass exerting its pressure on the liquid contained in the chamber.

In these devices, the chamber of each of these elastic masses communicates with the mechanically deformable space through relatively wide section nozzles, so that the pressure of these elastic masses follows, without much inertia, that of the mechanically deformable space.

These elastic masses which cooperate with the uniform section throttling apertures, thus only act for opposing a pressure, progressively increasing or decreasing, according to the case, to the pressure variations due to the modifications of the mechanically deformable space.

One object of the invention is to obtain a suspension device in which the pressure of the liquid in the mechanically deformable space is brought, after the impact, to a value corresponding to the mean equilibrium pressure, the action of the damping members being controlled in relation to the difference existing between the mean equilibrium pressure and a pressure in relation to that which prevails in the mechanically deformable space.

A still further object is to produce a suspension in which the mean equilibrium pressure is materialized under the actual load or running conditions of the suspended mass, so that:

(a) The movements of the suspended mass which deflect it from its mean equilibrium position, are not essentially braked except by the pressure variations of an elastic agent;

(b) The return movements of the mass towards its mean equilibrium position, are essentially braked in relation to the difference between the pressure of an elastic member and the mean pressure set up in the damping member.

Other objects and advantages of the invention will appear from the detailed description below.

FIGURES 1, 2, 3 and 6 show modifications more particularly applicable to the form wherein there is a separation by a flexible distortable membrane of the compressed gas and the liquid transmitting the suspension stresses to the arms holding the wheels through hydraulic shock absorbers directly or indirectly connected to them.

Two chief objectives are sought:

(1) The damping of the movements of the suspended mass without hardening the suspension, by increasing its resistance to movement in restoring it to its mean equilibrium position. In this type of damping the movements that correspond to a deflection increasing from the mean position, are only braked by the pressure variation resulting from the relative variations of the total volume occupied by the compressed gas beyond the elastic membrane.

(2) More vigorous damping effects than the preceding ones for fluid displacements from the wheel shock absorbers, corresponding to wheel oscillation frequencies. These effects are obtained by superimposing in series on the action under (1), the effect of combination of an adjustable throttled opening and an adjustable spring flap valve, the latter facilitating the passage of the fluid in the direction of the outlet from the wheel shock absorber.

Figure 1:
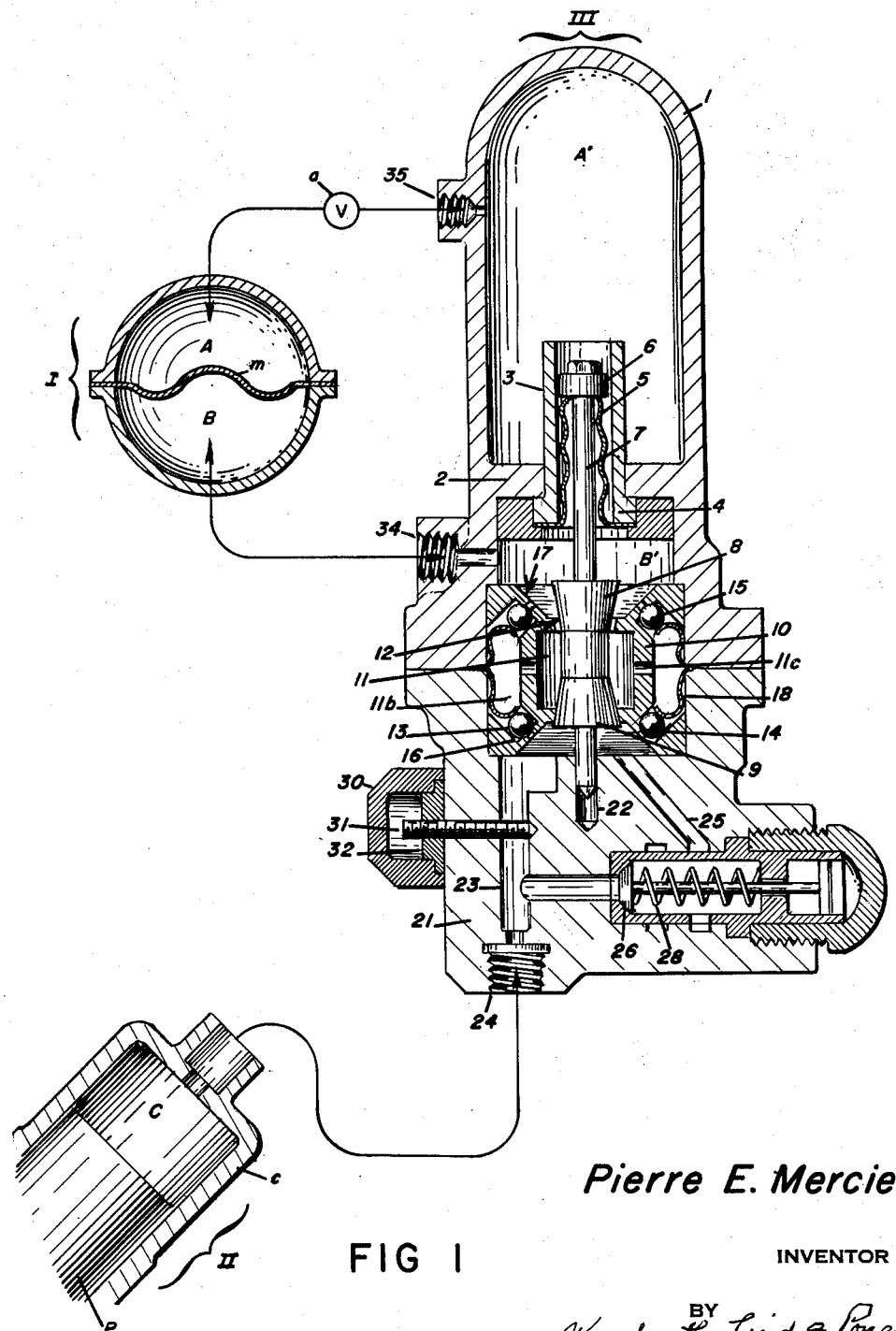
FIGURE 1 represents schematically and in sectional elevation a first modification for constructing a suspension arrangement for a vehicle.
Figure 2:
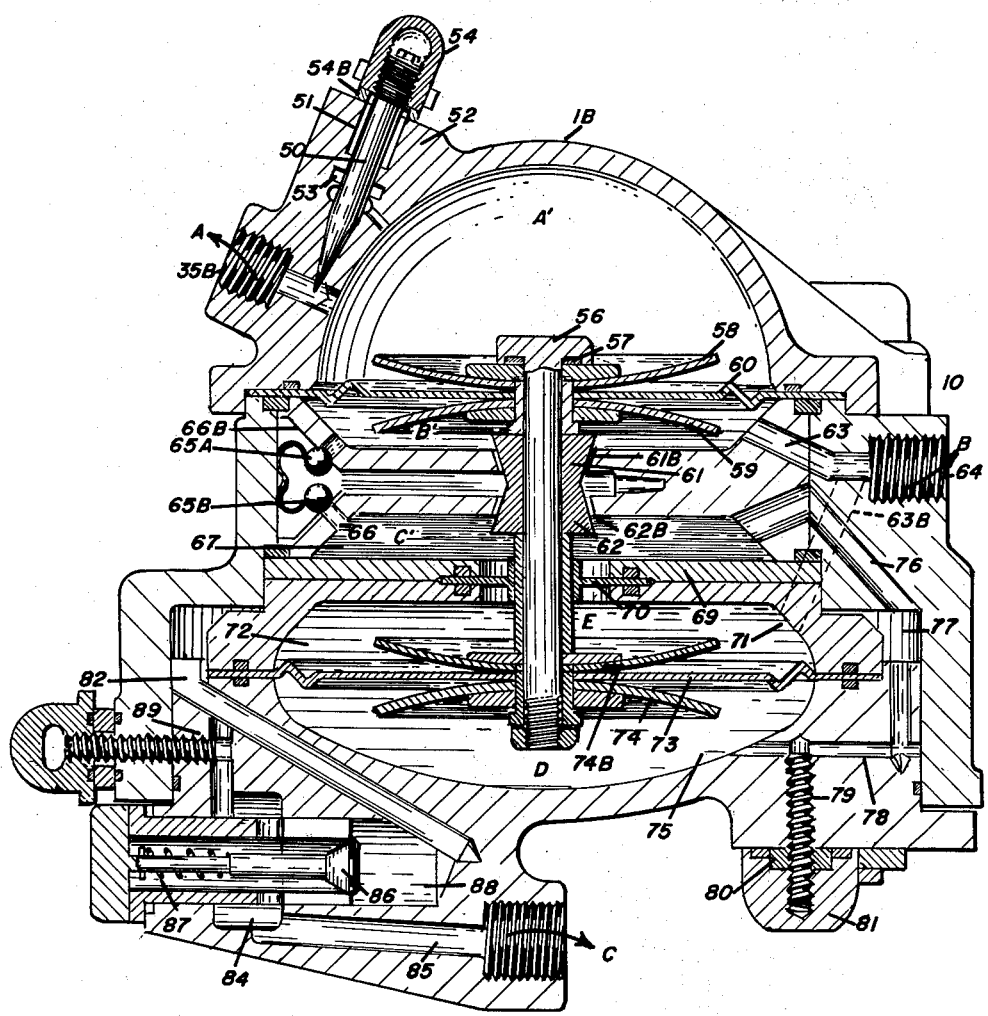
FIGURE 2 shows a sectional elevation of a modification of the suspension arrangement shown in FIGURE 1.

Referring to FIGURES 1 and 2, the suspension essentially comprises a first basic component I formed of a spherical container divided into two chambers A and B by a membrane $m$. The chamber A contains a gas under pressure acting resiliently and the chamber B contains a fluid subject to the pressure of such gas.

A second basic component II is formed by a cylinder $c$ and a piston $p$ assembly, forming a mechanically distortable space C, attached to the suspended mass. The space C is subject to the pressure of the compressed gas of the chamber A through the intermediary of the suspension fluid.

A third component III controlling the damping effects comprises three main compartments.

The first compartment A' which is the pilot compartment is in communication through an adjustable calibrated nozzle $a$ with the chamber A.

A second compartment B' is in direct communication with the fluid of chamber B.

Third compartment C' is in direct communication through channels 23 and 25 with the hydraulic wheel shock absorber C.

The hydraulic braking effects which carry out the chief objectives mentioned above, take place between the second and third compartments B' and C' and depend both on the direction taken by the fluid and the pressure of the compressed gas in compartment A' or pilot cavity which pressure is dependent upon the mean value of the gas in compartment A in contact with the elastic membrane $m$.

A container 1 enclosing the compartment A' has a wall 2 through which extends a cylindrical extension 3 to which is welded at its lower edge 4, an elastic bellows 5 made of tombac or similar material. The upper edge of the bellows 5 is fixed to an axle 7 carrying two truncated shoulders 8 and 9 facing one another forming a double valve cooperating with a hollow central body 10 having an auxiliary chamber 11 and provided with two tapered bearings 12 and 13 with which the shoulders 8 and 9 cooperate.

Also cooperating with the central body 10 are ball flap valves 14 and 15 arranged in rings having seats 16 and 17 open to the auxiliary chamber 11 through channels 11c thereby interconnecting the annular space 11b with the chamber 11. Leaf springs 18 urge the balls against their seats.

Threading 34 upon container 1 is provided for the pipe connecting chamber B with compartment B'. The pipe connecting the wheel shock absorber is inserted at 24 in the lower part 21 of component III. This latter connection connects with the compartment C' situated below the central body 10, by channels 23 and 25.

In the channel 23 there is provided a throttling screw 31, locked by the nut 32 and capped by the hood 30 and in the channel 25 there is a flap valve 26 urged to its seat by a spring 28, connecting compartment C' with 24 in the direction C–C'.

An extension of the axle 7 is inserted in a bore 22 which ensures both the guiding of the axle 7 and a dash-pot effect.

The device described above operates as follows.

When, due to a displacement of the wheel shock absorber, the volume C varies, the action is as follows:

The volume C is reduced and fluid enters into component III at 24. If the movement is slow, as in the case of a body movement, the resistance offered to its passage through the throttle controlled by the screw 31 is slight.

The regulation of the throttling control by the screw 31 is such that for slow movements the difference in pressure in the compartment C' and the canal 23 is slight compared to the action of the spring 28 acting upon the valve 26.

Under these conditions the action of the valve 26 is minor and changes very slightly the damping conditions.

The fluid driven into the chamber C' thrusts aside the flap valves 14 enters the intermediate chamber 11 and then the chamber B' by passing through the seat 12 of the valve which is in its upper position as will be seen below.

The fluid then enters the chamber B from compartment B' through the pipe connected at 34.

The gas pressure in chamber A increases. In a sufficiently short space of time, the pressure in the pilot compartment A' does not change owing to the throttling provided between chamber A and compartment A'. The pressure in chamber B is now the same as in chamber A and there is a pressure difference between compartments B' and A'. The pressure in B' being higher than in A', the elastic bellows 5 tends to stretch. The truncated shoulder 9 is urged against its seat 13, leaving a free space between the seat 12 and the shoulder 8. The passage of fluid from the compartment C' into the compartment B' is thus accomplished.

When the piston p, having reached its maximum drive, commences to return to its normal position, the fluid must pass from the compartment B' to the compartment C'. It can only do this by forcing the annular shoulder 9 and the axle 7 fixed thereto downwardly with regard to the central body 10. This displacement takes place when the pressure difference between B' and C' acting on the shoulder 9, balances the pressure difference existing between A' and B' thereby retracting the bellows 5.

The ratio between the effectual section of the bellows 5 and the mean section of the shoulder 13 characterizes the percentage of damping in the movement for restoring balance.

If, starting from equilibrium, a movement of piston p increases the volume C, for slight piston speeds and hence slight displacement speeds of the fluid in the piping and through the damping member, the action would occur in a manner similar to that which has just been described. The damping means offers only a slight resistance when the equilibrium is disturbed and has a damping effect which is a function of the ratio of the effectual sections of the elastic bellows and the shoulder 12 in the return movement towards the mean normal position.

On the other hand, in the case of a rapid displacement of the wheel shock absorbers, a greater effect is superimposed on the preceding actions by the throttling controlled by the screw 31, in the case of an enlargement of the volume C; and by the superimposition of the preceding throttling effects and the effect of the flap valve 26 in the case of a reduction of the volume C. Thus, as seen by the preceding description, the throttled piping does not have the purpose of modulating the pressure prevailing in the damping member as compartment C', but of adjusting that pressure to the mean value of the pressure of the elastic member as compartment B' so as to allow for the static deflection variations, due to a change in the weight carried, to a displacement of that weight on the suspension frame, to the consequences of its slant owing to the slope of the ground on which said frame rests or more generally when the vehicle is moving, to the variations of apparent acceleration of weight resulting from the longitudinal or traverse curvature of the trajectory taken by the vehicle.

Moreover, we must note that the differential damping pressures set up by the damping member being on the average symmetrically distributed on either side of the mean equilibrium position, it is not indispensable, in the case where the throttled piping should be traversed by the fluid, to connect it directly to the fluid in contact with the elastic chamber A. It will be simpler, from the standpoint of practical achievement, to effect this throttled communication between the damping member and one of the chambers containing the fluid when the suspension is in action.

A slight disadvantage of the embodiment given above lies chiefly in the smallness of the elastic bellows 5 whose dimensions are linked to those of the truncated shoulders 8 and 9 and the axle 7. Other forms may be considered in which the fluid actions controlling the axle 7 will be exerted on much greater surfaces than those of the shoulders 8 and 9 borne by said axle.

The embodiment shown in FIGURE 2 answers these requirements. In this case, the double valve comprises two truncated shoulders 61 and 62 cooperating with the seats 61B and 62B of the central body 10. The rings of ball flap valves are indicated at 65, 65B.

The compartment A' provided in the container 1B is in communication with the chamber A of the basic component 1 by a throttled connection connected at 35B. The throttling is obtained by a needle valve 50 screwed into a threaded hole 51 drilled in a boss 52 of the container 1B. The needle is capped by the hood 54, stopped by the nut 54B and a washer 53 ensures fluid-tightness.

The chamber B' is separated from the chamber A' by a membrane 60 secured between two spherical cupels 58, 59. This membrane is connected to the double valve by the axle 56. The chamber B' is in communication with the chamber B of the suspension component I by a pipe connected at 64 and a channel 63.

The compartment C' is in communication with the volume C through a piping 76, an annular chamber 77 and piping 82 and 85, which encompass the body of the flap valve 86 by the groove 84. This piping may be regulated as previously by a needle valve 83.

In this embodiment the double valve is connected by its axle 56 to a second membrane 73, which delimits two chambers D and E. The chamber D is in communication with the compartment C' through the piping 78, emerging in the annular chamber 77 and throttled by the needle valve 79 for the dash-pot effect preventing vibrations of the double valve on its seating.

The chamber E is delimited at its top part by a partition 69 and comprises a floating diaphragm 70 and is in direct communication with the compartment B' through the pipe 63B emerging at 71 and 63.

The second membrane 73 is also secured between two cupels 74 and 74B of spherical shape. These cupels are the same as those retaining the upper membrane, and reduces the flexion fatigue of the membranes in action in the case where the differential pressures encountered are high.

The operation of this second embodiment is appreciably the same as the one already explained:

When the volume C is reduced, the fluid enters the damping member through the piping 85. If this movement is slow, the resistance offered to its passage by the throttling controlled by the screw 83 is slight and the valve 86 does not come into action. The fluid then flows through the pipe 82 into the annular chamber 77, then into the chamber C' and also into the chamber D through the piping throttled by the needle valve 79. From the chamber C', the fluid passes by the seats 66 of the ball valves 65, crosses the upper seat 61B of the double valve and enters the chamber B' and from there, into the chamber B of the suspension member or component I. The pressure at A increases but for a sufficiently short space of time that the pressure at A' does not alter owing to the throttling by the screw 50. Due to this pressure difference between A' and B', the double valve moves upwardly, so that its lower shoulder 62 is urged against its seat 62B. This movement is not delayed by differential pressures exerted on the membranes because in the normal position (as in FIG. 2) the double valve is in the intermediate position and does not rest on one of its seats.

When the piston P in component II returns to its normal position, the fluid must pass from the chamber B' towards the chamber C' compelling the shoulder 62 of the valve to move downwardly from its seat 62B. The throttling 79 is so adjusted that the movement has had time enough to take place during the first quarter-oscillation.

In this form of embodiment this displacement becomes stabilized when the pressure difference between B' and C' acting on the effectual surface of the double valve, added to the pressure difference between the chambers E and D acting on the surface of the lower membrane, balances the pressure difference existing between A' and B' and attracting the upper membrane 60.

The damping rate thus results from the ratio of the upper membrane surface and the lower membrane surface plus the effectual double valve surface.

The opposing differential pressures brought to play on the upper and lower membrane 60 and 73, being relatively great with regard to those that are exerted on the valve itself, the sensitiveness of the devise is increased over the sensitiveness of the embodiment of FIG. 1. This ratio of the surfaces of the membranes and the valve surfaces has been exaggerated in the drawing.

Also, as in the example previously described, the rapid displacement of the wheel shock absorber results in a greater effect by the throttling passage controlled by the screw 83 if it is a case of an increase of the volume C (wheel expansion) whereas there is a superimposition of the preceding throttling effect and effect of the valve 86 in the event of a decrease of the volume C.

Figure 3:
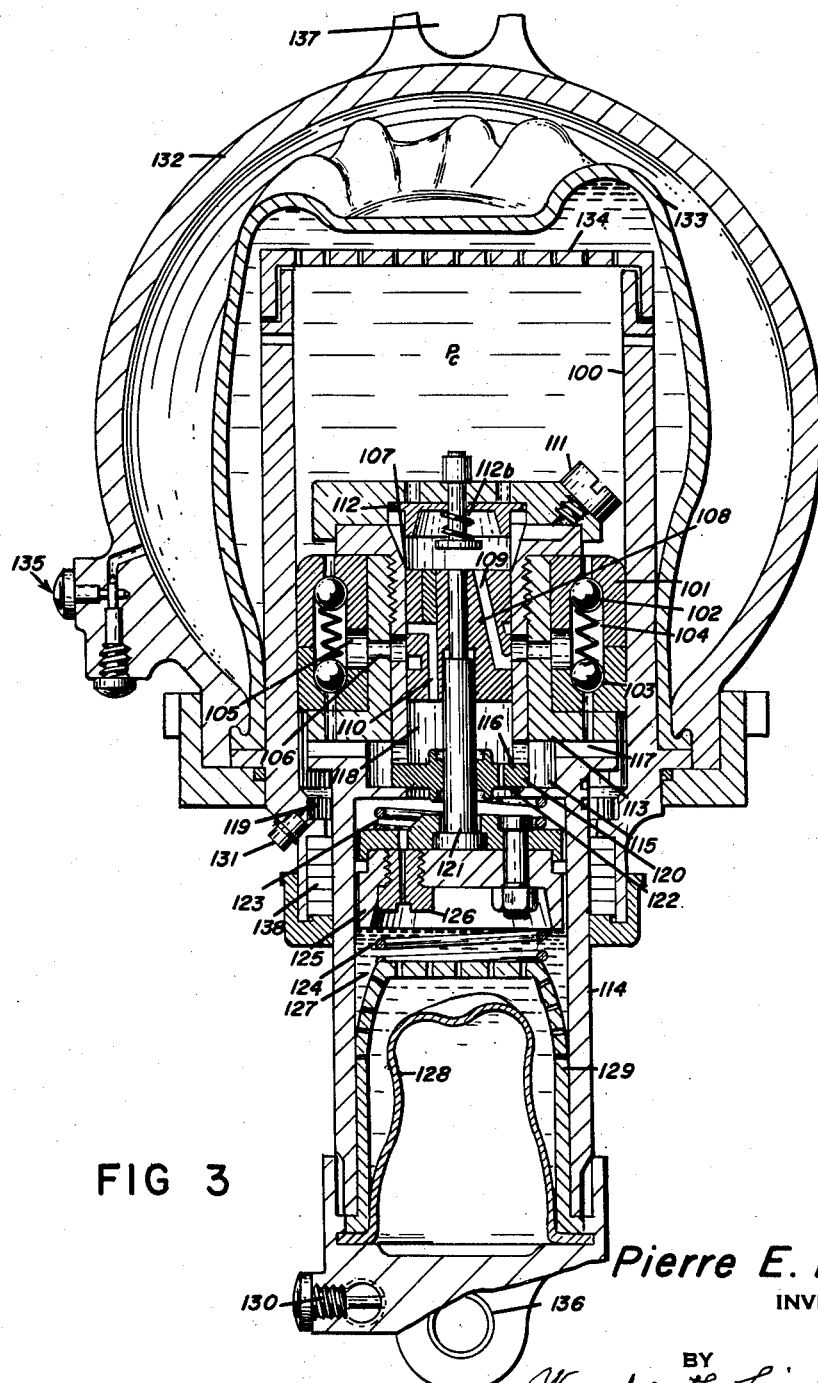
FIGURE 3 shows a sectional elevation of another modification in which the different elements are combined in a single ensemble.

FIGURE 3 shows another embodiment of the invention. In this case all the volumes and damping members or their equivalents previously described are combined in one and the same assembly forming a complete suspension device, which is advantageous, for example, on a vehicle. This, if so desired, also enables all external piping to be eliminated. This embodiment also has this feature in that instead of effecting a communication between the pilot compartment setting up the mean pressure and being entirely full of compressed gas and the main gas chamber which forms the elastic agents, there is preferably used, in the pilot compartment, a mass of unvarying gas occupying, only a part of the volume of the pilot compartment, the remainder of the volume containing fluid in throttled communication with the variable compartments or chambers of the suspension member corresponding to the chambers B and C. This fluid is separated from the mass of gas in the pilot compartment by a membrane, or if so desired, by a floating piston. This solution allows the double valve or slide-valve to be controlled, while carrying out the operation, by means of pistons, which are less bulky and not as delicate as the membranes subjected to differential damping pressures.

In an embodiment of this kind, variations in the pressure of the gas, which acts as an elastic agent, are transmitted to the pilot volume through the intermediary of the fluid.

FIGURE 3 shows a construction wherein two mechanically deformable volumes are connected to the suspended mass. One of such volumes is enclosed by the cylinder 100 containing a liquid while the other volume is located in the annular chamber 119 which is in communication with the cylinder 100 through the ball valves 102 and 103 separated by the springs 104, and through the central slide valve 108 and the radial passages 105, 106.

The cylinder 100 is in communication through the orifices provided upon its lateral wall and upon the top 134 with a container 133 having a deformable exterior wall. This wall is subjected to the pressure of a gas contained in the spherical container 132.

A piston reciprocates in the cylinder 100 and is provided with a damping element intercalated between the annular chamber 119 and the container 133 containing the liquid.

This damping element is acted upon by a pilot compartment 127 containing a liquid and limited by a container 128 having a deformable wall subjected to the pressure of a gas in order to set up in the pilot compartment 127 the average pressure of equilibrium. That is of the pressure defined by the integration during a relatively long period of time of the oscillations of the suspended mass and its effects upon the pressure in the mechanically deformable space. The pilot compartment 127 communicates with the annular chamber 119 across the nozzle 126 the channel 122 of the diaphragm 120 and the channels of ports 115, 116 and 117.

In the head 101 of the piston there are two ball valves 102 and 103 wherein the balls are separated by the springs 104. The ball valves 102 and 103 are formed by rings with apertures therein cooperating with the balls which open or close these apertures. These ball valves 102 and 103 are arranged in pairs and they have similar functions, one for securing communication with the cylinder 100, the other for assuring communication with the annular chamber 119. An intermediary chamber 105 is provided between the two ball valves in the head 101. Through the orifices 106 provided across the assembly piece 107, the chamber 105 communicates with the slide valve 108 playing the role of a double valve due to the canals 109 and 110. In the upper portion of the piece 107 a nozzle 111 is provided. The valve 112 biased by the spring 112b intervenes in the damping of rapid oscillations.

The part 107 is screwed into the cylindrical extension 113 of the piston rod 114. An annular chamber 115 and channels 116 and 117 connect the annular space 118 and the annular chamber 119. The diaphragm 120 through which the rod or the slide-valve 121 passes, comprises a channel 122 acting as a dash-pot.

The springs 123 and 124 tend to hold slide-valve in its normal mean position. The slide-valve is controlled by the piston 125, which carries the nozzle 126 whereby the mean pressures are transmitted to the pilot compartment 127, which includes the elastic gas container 128 limited in its possible expansions by the perforated wall 129. The mean pressures are transmitted to the pilot compartment 127 because the oscillations of the suspended mass on either side of the average valve are substantially equal.

The pressurizing of the container 128 takes place through the plug corresponding to the fluid-tight needle 130 and the fluid filling (the appliance being tilted) takes place through the plug 131. The attachment means are shown diagrammatically at 136 and 137. The fluid-tight packing between the cylinder 100 and the piston rod 114 is shown diagrammatically at 138.

The operation of the above device is somewhat similar to that of the other embodiments described. When the volume of the cylinder 100 is reduced owing to the movement of the suspended mass, the fluid that it contains receives an increased reactional pressure from the compressed gas in container 132, so that fluid is forced into the chamber 105 through ball valves 102, then along the channels 110 of the slide-valve and then through the opening 122 of the diaphragm 120 to act on the upper face of the piston 125. The momentary pressure difference between the upper and lower faces of the piston 125, lowers this piston and the slide-valve 108 which is attached thereto.

The operation of the suspension arrangement comprises particularly the four following phases:

(a) The piston 101 rises while starting from its equilibrium position;

(b) The piston 101 descends to regain its equilibrium position;

(c) The piston 101 descends while leaving its equilibrium position;

(d) The piston rises to regain its equilibrium position.

These four phases of operation are examiner below.

(a) The piston 101 rises by leaving its equilibrium position:

Let $P_T$ be the pressure in the cylinder 100.

At the beginning of the movement, $P_T = P_C$.

Step by step in accordance with the rise of the piston 101, $P_C$ increases and there will therefore be a slight flow of fluid towards the bottom across the nozzle 126.

This movement is superimposed upon the general movement of the fluid of cylinder 100 towards the annular chamber 119 which is increasing as the piston rises.

In this movement the liquid coming from the cylinder 100 pushes back the ball valve 102. In accordance with the movement upwardly the slide 108 has a tendency to descend in the piston sleeve 107 in such a way that a free passage is established by the passages 105, 106, and the channels 110 of the slide 108. There is therefore little or no hydraulic braking and a very small portion of the fluid tends to pass across the nozzle 126.

(b) The piston 101 descends to regain its equilibrium position:

At the beginning $P_T$ is smaller than $P_C$.

The slide 108 occupies a low position, the ports 110 open into the channels but the balls 102 oppose the passage of liquid, whereby there is an increase of the pressure in the chamber 123. As this becomes high enough, the slide 108 is raised and the liquid at this moment by raising the ball valve 103 passing across 105, 106, and through the channels 109 will flow above the slide 108 and escape into 100 across the nozzle 111 which introduces a supplemental braking acting only on rapid oscillations.

Outside the nozzle 111 the damping of the movement is produced by the diminution of the action of $P_C$ upon the section of the piston 101 due to the orifices in cylinder 100.

(c) The piston 101 descends starting from its equilibrium position:

At the beginning we have therefore $P_T$ equal to $P_C$.

In accordance with the descent of piston 101, $P_C$ diminishes and becomes smaller than $P_T$.

Due to this fact the slide 108 occupies a high position during the descent. The liquid leaving the annular chamber 119 pushes back the ball valves 103 and, the slide being in its high position, the liquid passes across 105, 106 and 109. In this movement the valve 112 remaining closed the liquid passes through the nozzle 111 whose cross-section has been established in order to brake the rapid movements due to the oscillations of the wheels but reacts slightly to the slow movements of the suspended mass.

A very small quantity of liquid tends to leave the pilot compartment 127 by passing across 126.

(d) The piston 101 rises to regain its equilibrium position:

In this case, $P_T$ is greater than $P_C$ until the equilibrium position is reached.

There results therefrom a very slight flow from the pilot compartment 127 across the nozzle 126, the gas located in 128 having a tendency to expand.

As $P_T$ is greater than $P_C$ the slide 108 has a tendency to assume its high position. The canals 110 are blocked. As the liquid of cylinder 100 penetrates across the nozzle 111 and the valve 112 due to the high position of the slide it will be obliged to use the channel 109 and flow into the ball valves through the apertures 105 and the balls will oppose the descent of the liquid towards 119.

No liquid being able to pass to 119, a vacuum will appear in this chamber. This depression will act upon the lower annular surface of the valve 108. When it reaches a value sufficient to neutralize the effect of the stoppage on the lower face of the piston 125 ($P_T$) the slide 108 descends, opening the passage of the ports 110 upon 105 and 106. The depression which prevails upon the annular surface of the chamber 119 is equivalent to an imaginary stoppage in the cylinder 100 giving consequently a damping effect by an increase in flexibility because it acts as if a pressure equal or near $P_T$ is established in the cylinder 100.

The throttlings 111 and valve 112 act as in the preceding examples.

It is possible to eliminate the employment of gas as in FIGURE 3 and use the compressibility of the liquid as an elastic agent. It would be necessary that the volume generated by the displacement of the piston rod 114 should be somewhat small in relation to the total liquid. In this case, provided there is a correct scale on the drawing for the various members, the device described may still either retain gas in the pilot volume to prevent too great variations of pressures in the pilot compartment owing to the displacements of the slide-valve, or utilize the compressibility of a liquid, with a suitable piston rod size, for controlling the movements of the slide valve and the damping effects.

Figure 4:
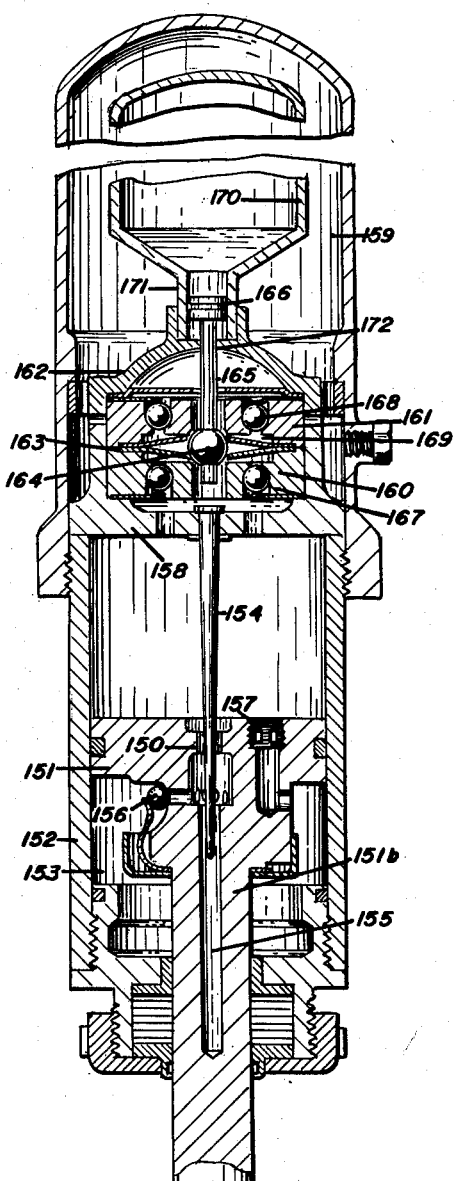
FIGURE 4 shows in sectional elevation a suspension arrangement comprising a divided elastic mass.

An embodiment of this kind is shown in FIGURE 4. In this case, the device is more especially applicable to a shock absorber on the landing gear of an aircraft.

In this case, there is added, to the problems previously defined and which concern the damping of the various frequencies of possible oscillation, the problem of the damping of kinetic energy of the suspended mass in the event of a forced landing. In order then to obtain the maximum end-to-end compression power, it is necessary to superimpose on the elastic force ensuring the suspension during running, a force of hydrodynamic origin resulting, for example, from passing, through a variable nozzle 150, the liquid driven by the piston head, when a portion of the mechanically distortable space is partially achieved by the piston 151 in its cylinder 152.

Furthermore, seeing that the compressibility coefficient of the fluid in its container only admits of a small section for the piston rod, bearing its stroke in mind, in relation to the total volume occupied by the fluid, it is advantageous, in this case, to use a double-acting piston and effect the passing of the fluid between the upper section of the cylinder and the annular chamber 153 comprised between the piston rod 151b, a portion of the cylinder 152 and the piston lower face.

A convenient solution of the problem of achieving the variable jet and damping short-period oscillations (wheel oscillations) then consists in using a needle 154 carried by the cylinder which enters into a bore 155 in the piston rod combined with a valve system 156 for preventing the fluid from returning through the jet 150 controlled by the needle during the extension movements of the suspension damper. The fluid braking of rapid movements corresponding to extension movements is then achieved by a jet such as the nozzle 157. The needle 154 is carried by a partition 158 which limits the cylinder 152.

The damping of slow oscillations is, moreover, ensured by controlling the fluid displacements between the cylindrical chamber where the piston 151 moves, and the cylindrical chamber 159 containing the fluid whose compressibility is used. This control is obtained by the valve and flap-valve system arranged above the partition 158 with an elastic washer 169 perforated to allow communication. This system comprises two twin components 160 and 161 applied against one another by the part 162 which itself bears against the wall of the chamber 159. These two components secure two elastic washers 169 between them which ensure the recoil of the double valve 164 to the equilibrium position. This double valve is formed of two opposed cones, fitted on a rod 165 integral with the piston 166, cooperating with seats provided on the twin components 160 and 161.

The ball valves 167 and 168 arranged in a double ring open towards the exterior of the intermediate chamber provided between the twin components.

The circulation in this device is thus the reverse of that of the preceding devices but the double valve is still controlled by a differential pressure which is partly a function of the pressures exerted in the pilot container 170 and in the cylinder 159 which only communicates by the play existing between the piston 166 and the cylindrical portion 171 and the play existing between the rod 165 of the piston 166 and the opening 172 of the part 162 which ensures a dash-pot effect.

Lastly, it should be pointed out for this embodiment that the dimensions of the controlling device, double valve 164, piston 166 and ball valves 167 and 168 have been somewhat enlarged for clarification. As a matter of fact, owing to the low rate of compressibility of the fluid, these dimensions as well as the stroke of the valve, might advantageously be reduced.

Figure 5:
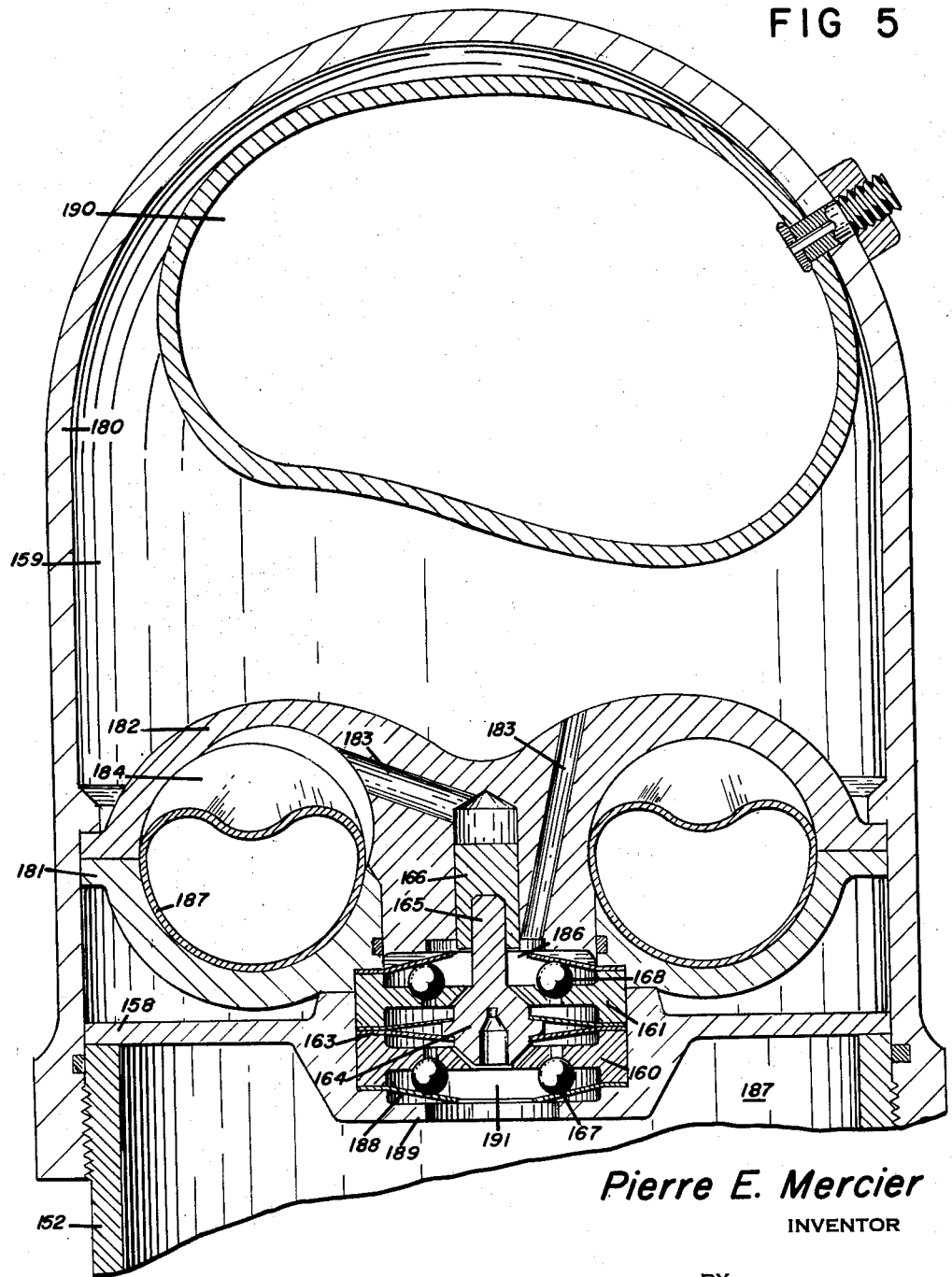
FIGURE 5 shows in partial elevation a modification of the suspension arrangement of FIGURE 4.

However, in the case, for example, of a suspension member according to FIGURE 4, possibly modified according to FIGURE 5, it would be most advisable to place the fractionated elastic mass on the opposite side to the piston with regard to the main elastic mass.

In the appliance partially illustrated in FIGURE 5 184 designates a toric cell containing the separating membrane 187 containing the auxiliary volume of the elastic mass. This cell is provided between the parts 181 and 182 which are fixed under the container 180 containing the main gaseous elastic mass enclosed in the membrane 190. The cell 184 communicates by channels 183 with the small piston chamber 166. Channels 185 connect the space 159 with the space 186 containing the flap valves 167 and 168 and the control piston 166 of the double valve 164 integral with the rod 165.

161 designates the upper flap-valve holder semi-unit and 160 the lower flap-valve holder semi-unit. Between these two semi-units are the perforated recoil springs 163 of the double valve. The aperture of these flap-valves is limited by the abutments 189.

The lower chamber 191 emerges freely into the space situated above the piston. All the constituent component of the toric chamber and its flap-valves are maintained by locking the upper body 180 on the lower section 152 which are screwed together with fluid-tight washers.

Figure 6:
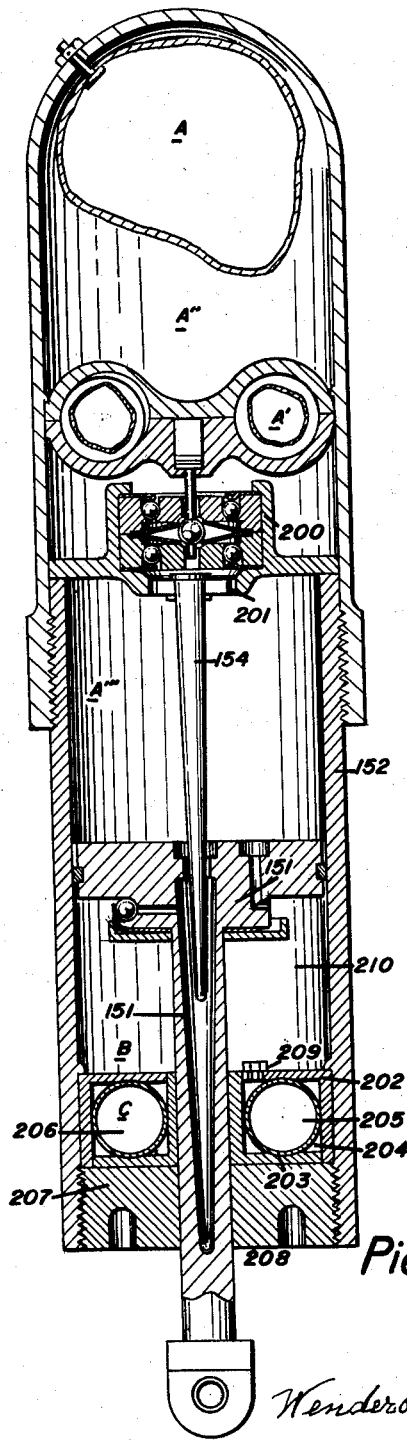
FIGURE 6 shows a sectional arrangement of another modification of the suspension arrangement shown in FIGURE 4.

FIGURE 6 shows a suspension member of the type of FIGURE 4 in which the toric component described above is placed and the fractionated elastic mass 206 is housed in the cell 204 arranged around the piston rod 151. The two casings 202 and 203 enclose the cell 204. The fluid occupying the empty space in the cell 204 is in communication by the jet 209 with the space 210 (chamber B) located under the piston.

Figure 7:
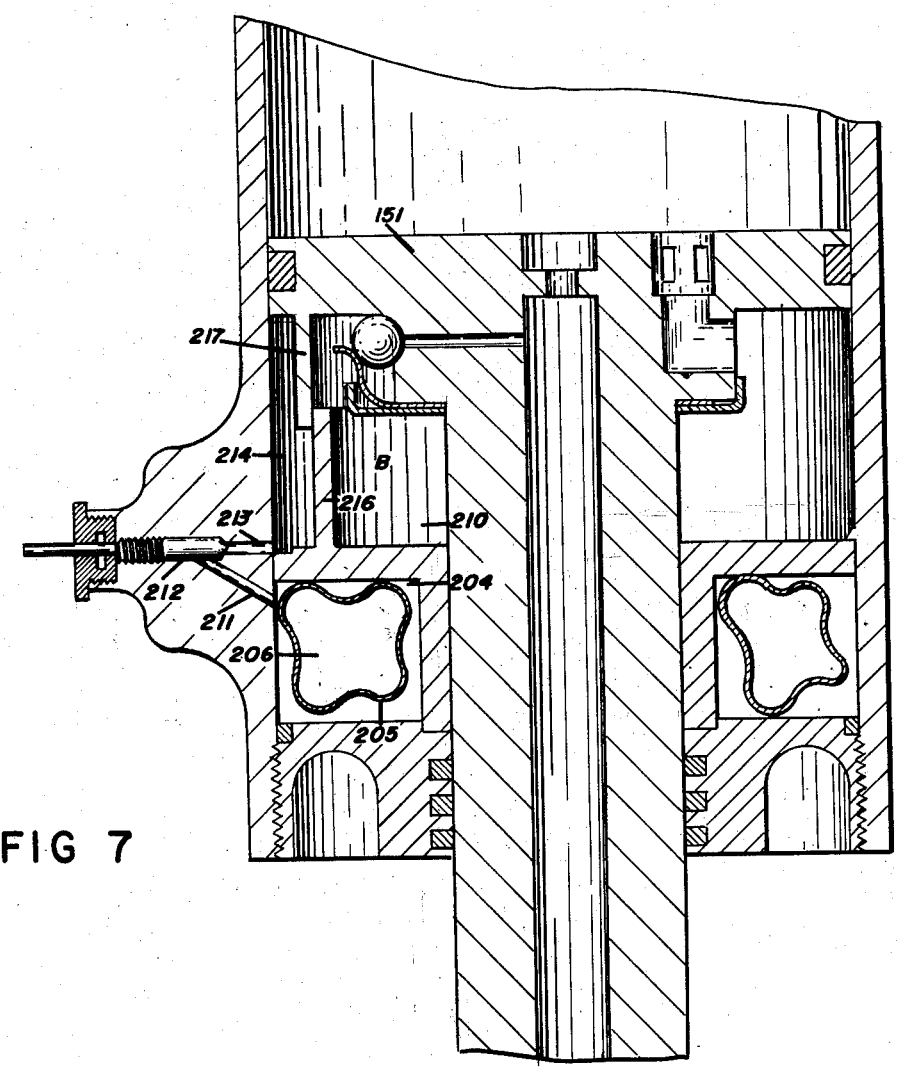
FIGURE 7 shows a partial sectional elevation of a modification of the suspension arrangement shown in FIGURE 6.

FIGURE 7 partially shows a suspension device of the preceding type. In this case, the fractionated elastic mass 206 (chamber C), the membrane 205 which delimits the spaces in the cell 204 occupied by the fluid that surrounds it are shown. Communication between 204 and 210 (chamber B) comprises the oblique channel 211 controlled by the needle 212 which controls the channel 213 emerging in the annular space 214 which is itself controlled by the piston in its low position by means of the apron 217 and the fixed collar 216. This annular space 214, in combination with space 206 when the needle 212 is open, forms an elastic buffer which prevents piston 151 from "bottoming" or striking the bottom of the cylinder.

Nevertheless, it goes without saying that the invention should not be restricted to the examples of embodiment described from which it should be easy to devise many alternative forms of embodiment.

More particularly, it is obvious that it is possible to group and combine the components forming the suspension in various manners. It would be possible to group the damping component III and the distortable member component II, in a single member assembly, by connecting said assembly to the separated zone I containing the elastic agent. Inversely, it would also be possible to combine in one and the same assembly, the damping member such as III and the zone I containing the elastic agent and connect this assembly to the distortable member II.

I claim:
1. A suspension for vehicles or other applications comprising a cylinder, a piston reciprocating in said cylinder forming at least one mechanically deformable space containing a liquid, said piston and cylinder being fixed respectively to a suspended mass and to a wheel carrying element, a chamber containing a liquid, means subjecting said liquid to an elastic pressure, means for decanting the liquid contained in said chamber subjected to an elastic pressure, a pilot compartment containing hydraulic elements subjecting the fluid contained in said compartment to an elastic pressure, means forming a restricted communication between the liquid of said compartment and the liquid contained in one of the deformable spaces in such a manner that the pressure in said pilot compartment does not follow, because of the restricted passage, the rapid variations of the pressure prevailing in the chamber containing the liquid subjected to an elastic pressure, damping elements interposed between said deformable space and the chamber containing the liquid subjected to an elastic pressure and comprising a slide valve subjected on one hand to the difference of pressure between the deformable space and the liquid of said chamber and on the other hand opposing the average pressure in said compartment, discharge orifices in said valve in order to assure a damping by restricting the liquid arriving from said mechanically deformable space and directing it towards the liquid contained in said chamber and vice versa, a pair of flap valves located between said pilot compartment and said mechanically deformable space eliminating the effects of the damping when the suspension element by extension or contraction is displaced from its equilibrium position and allowing the damping elements to act when said suspension elements comes back to its position of equilibrium by contraction or extension.

2. A suspension for vehicles or other applications comprising a cylinder, a piston reciprocating in said cylinder forming at least two mechanically deformable spaces, deformable in opposite directions, said spaces containing a liquid, said piston and cylinder being fixed respectively to a suspended mass and to a wheel carrying element, a chamber containing a liquid, means subjecting said liquid to an elastic pressure, means for decanting the liquid contained in said chamber subjected to an elastic pressure, a pilot compartment containing hydraulic elements subjecting the fluid contained in said compartment to an elastic pressure, means forming a restricted communication between the liquid of said compartment and the liquid contained in one of the deformable spaces in such a manner that the pressure in said pilot compartment does not follow, because of the restricted passage, the rapid variations of the pressure prevailing in the chamber containing the liquid subjected to an elastic pressure, damping elements interposed between said deformable space and the chamber containing the liquid subjected to an elastic pressure and comprising a slide valve subjected on one hand to the difference of pressure between the deformable space and the liquid of said chamber and on the other hand opposing the average pressure in said compartment, discharge orifices in said valve in order to assure a damping by restricting the liquid arriving from said mechanically deformable space and directing it towards the liquid contained in said chamber and vice versa, a channel nozzle combined with a unidirectional valve superposing their damping actions by the action of said slide valve across said discharge orifices by throttling the liquid passing from one of said mechanically deformable spaces to the other mechanically deformable space, said nozzle being of a size sufficient in order only to affect the rapid oscillations of the suspended element corresponding to the vibrations of the non-suspended masses such as the carrying wheels.

References Cited in the file of this patent

UNITED STATES PATENTS

| | | |
|---|---|---|
| 2,031,000 | Mercier | Feb. 18, 1936 |
| 2,451,171 | Mullen | Oct. 12, 1948 |